United States Patent
Singh et al.

(10) Patent No.: US 9,686,381 B1
(45) Date of Patent: Jun. 20, 2017

(54) CONTROL WORD DECAPSULATION IN A HYBRID BGP-VPLS NETWORK

(71) Applicant: Juniper Networks, Inc., Sunnyvale, CA (US)

(72) Inventors: Ravi Singh, Burlingame, CA (US); Vikas Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 462 days.

(21) Appl. No.: 14/042,534

(22) Filed: Sep. 30, 2013

(51) Int. Cl.
- *G06F 15/16* (2006.01)
- *H04L 29/06* (2006.01)
- *H04L 12/721* (2013.01)
- *H04L 12/723* (2013.01)

(52) U.S. Cl.
CPC .............. *H04L 69/22* (2013.01); *H04L 45/50* (2013.01); *H04L 45/68* (2013.01)

(58) Field of Classification Search
CPC ............ H04L 12/2697; H04L 12/4625; H04L 12/4633; H04L 41/5009; H04L 45/04; H04L 45/16; H04L 45/00; H04L 45/50; H04L 45/68
USPC .......................... 370/244, 248, 389, 392, 254
See application file for complete search history.

(56) References Cited

U.S. PATENT DOCUMENTS

| | | | | |
|---|---|---|---|---|
| 7,697,534 B1* | 4/2010 | Narayanan | .......... | H04L 12/4625 370/392 |
| 7,983,274 B2* | 7/2011 | Krzanowski | ........ | H04L 41/5009 370/244 |
| 7,986,695 B1* | 7/2011 | Kodeboyina | ........... | H04L 45/04 370/392 |
| 8,472,438 B2* | 6/2013 | Kini | ..................... | H04L 12/4633 370/389 |
| 2004/0151180 A1* | 8/2004 | Hu | ......................... | H04L 45/16 370/392 |
| 2008/0279110 A1* | 11/2008 | Hart | .................... | H04L 12/2697 370/248 |
| 2013/0286890 A1* | 10/2013 | Chen | ...................... | H04L 45/00 370/254 |

OTHER PUBLICATIONS

Zimmermann, "OSI Reference Model—the ISO Model of Architecture for Open Systems Interconnection," IEEE Transactions on Communications, vol. 28, No. 4, dated Apr. 1980, 8 pp.

(Continued)

*Primary Examiner* — Dustin Nguyen
(74) *Attorney, Agent, or Firm* — Shumaker & Sieffert, P.A.

(57) ABSTRACT

In general, techniques are described for decapsulating and forwarding VPLS frames in a hybrid PE router space. In one example, a method includes sending a first control plane message that includes first configuration information to a first PE router, the first control plane message comprising a request that the VPLS frames include a control word when forwarded to the first PE router. The first PE router may receive from a second PE router a second L3 control plane message that includes second configuration information for forwarding VPLS frames to the second PE router, the second L3 control plane message not comprising a request to include the control word when forwarded to the second PE router. The method may include configuring a forwarding plane of the first PE router to process VPLS frames that are received from the second PE router without processing the VPLS frames to remove the control word.

20 Claims, 5 Drawing Sheets

(56) References Cited

OTHER PUBLICATIONS

Bryant, "Pseudo Wire Emulation Edge-to-Edge (PWE3) Architecture," RFC 3985, Network Working Group, Mar. 2005, 40 pp.
Kompella et al., "Virtual Private LAN Service (VPLS) Using BGP for Auto-Discovery and Signaling," RFC 4761, Network Working Group, Jan. 2007, 28 pp.
Bryant et al., "Pseudowire Emulation Edge-to-Edge (PWE3) Control Word for Use over an MPLS PSN," RFC 4385, Network Working Group, Feb. 2006, 12 pp.
"LDP-BGP VPLS Interworking," White paper, Juniper Networks, Inc., 2010. 35 pp.
"Virtual Private LAN Service (VPLS)," Scalable Ethernet-Based Enterprise Connectivity and Broadband Delivery, White paper, Juniper Networks, Inc., Oct. 2007, 10 pp.

\* cited by examiner

CONTROL WORD DECAPSULATION IN A HYBRID BGP-VPLS NETWORK

TECHNICAL FIELD

The disclosure relates to computer networks and, more particularly, to virtual private local area network service (VPLS) instances established over computer networks.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

A virtual private local area network service (VPLS) may be used to extend two or more remote customer networks, i.e., VPLS sites, through a network (usually referred to as a service provider network), such as the Internet, in a transparent manner, i.e., as if the network does not exist. In particular, the VPLS transports layer two (L2) communications, such as Ethernet packets, between customer networks via the network. In a typical configuration, routers coupled to the customer networks (such routers will be referred to as "members of the VPLS") define label switched paths (LSPs) that may be used as the data transport for pseudowires within the service provider network to carry encapsulated L2 communications as if these customer networks were directly attached to the same local area network (LAN).

The service provider network includes multiple provider routers that form a core network for forwarding different types of traffic, such as IP-based traffic, VPLS traffic and the like. In some cases, routers in the core network may be coupled by more than one physical link to improve bandwidth and reliability. As a router forwards network packets to another router in the core across multiple links, the router may evenly distribute the network packets across each of the network links. In some instances, however, out-of-order delivery must be avoided when forwarding network traffic. For instance, packets that are associated with the same network flow should be forwarded on the same physical network link to prevent out-of-order delivery of the packets at the destination. Such packets that must be forwarded on the same links without reordering may be referred to as a flow. It may be ensured that packets belonging to a single flow are forwarded on the same links by computing a hash on certain fields in the packet headers, such that the hash computed on these fields on any packet in the given flow will result in the same hash value.

For this reason, routers within the core may perform preliminary inspection of packet headers within packets traversing the network to associate the packets with particular flows so as to ensure that packets of the same flow follow the same physical link. During this process the routers attempt to identify the type of packet (e.g., a VPLS packet, an IP packet or the like) in order to determine which portions of the packet to utilize for ensuring that the packet is forwarded on the same physical link as other packets of the packet flow. However, in some cases, routers may incorrectly determine the type of packet, causing improper processing and potentially leading to packets of the same flow to be directed along different physical links. For example, in some cases a preliminary inspection by a router may include determining whether the packet correctly specifies a valid IP version (e.g., "4" or "6") at a defined location of the packet header and, based on such a determination, concluding that the packet is an IP-based packet. However, in some examples, a VPLS frame may include information, such as a portion of a destination MAC address, in the same location of the frame header that would otherwise include the IP version (e.g., "4" or "6") of an IP packet. If a value at this defined location of the VPLS frame header includes a valid IP version value, the VPLS frame may be misidentified as an MPLS packet carrying an IP packet. In response, the router may forward the misidentified VPLS frame as an MPLS packet carrying an IP packet using a network link that is different than the network link used for the other VPLS frames in the network flow. For instance, the router may compute a hash on those fields that would ordinarily be used for hashing for IP packets. This incorrect hashing could cause packets of the same flow going over a VPLS to be forwarded on a logical link that is different than the logical link used for the other VPLS frames in the network flow. This may lead to out-of-order delivery.

To prevent out-of-order delivery, provider edge routers may employ techniques to insert a control word (e.g., string of zeros) when constructing a VPLS frame so as to effectively shift header information of VPLS payload headers out of the frame header location that would otherwise be inspected in an MPLS packet carrying an IP network packet for the IP version number, thereby avoiding the above described misclassification. Although such techniques using a control word may be implemented, situations may arise in which all provider edge routers in a service provider network may not support such techniques at the same time (e.g., due to legacy systems or systems that have not yet been upgraded). Therefore, some provider edge routers may support a control word, while others may not, which results in a hybrid provider edge router space. In some examples, a provider edge router that supports the use of a control word may improperly decapsulate and/or remove information from a VPLS frame that does not include a control word if the frame is received from a provider edge router that does not support the use of a control word in a hybrid provider edge router space. As a result, networks with this hybrid PE router space (i.e., a network in which only a subset of the VPLS-enabled PE routers support the use of a VPLS control word) may be hard to manage and operate.

SUMMARY

In general, this disclosure is directed to techniques for decapsulating and forwarding VPLS frames in a hybrid PE router space. In a service provider network that provides a VPLS, a subset of PE routers may support techniques for inserting a control word in VPLS frames, while the remaining subset of PE routers may not support a control word. In accordance with techniques of the disclosure, a PE router may configure its forwarding plane to apply different decapsulation and forwarding techniques to inbound VPLS frames to process VPLS frames sent by routers that embedded code words and to inbound VPLS frames sent by router that do not embed code words.

For example, a first PE router may initially send Network Layer Reachability Information (NLRI) with an Extended Community to announce a requirement that other routers insert a control word in VPLS frames when sending the VPLS frames to the first PE router. A second PE router, which does not support control word insertion, may send NLRI with an Extended Community that does not announce a requirement that routers insert a control word when sending VPLS frames to second PE router. Upon detecting such a message, the first PE router may determine that the second PE router does not support use of a VPLS control word and, moreover, may selectively configure its forwarding plane to expect from the second PE router VPLS frames lacking a control word even though the first PE router requested otherwise. Therefore, the first PE router may configure its forwarding plane to decapsulate and forward VPLS frames differently when such frames are received from the second PE router that did not request use of a control word when sending traffic to the second PE router. In particular, the first PE router may configure its forwarding plane to remove the control word from VPLS frames that are received from PE routers that similarly announced a requirement that VPLS frames send to the PE routers should include a control word. In addition, the first PE router may also configure its forwarding plane to not perform a control word removal from VPLS frames that are received from the second PE router that did not make such an announcement. That is, even though the first PE router announced a requirement that VPLS frames sent to the first PE router must include a control work, the first PE router effectively overrode this requirement when programming its forwarding plane with respect to decapsulating VPLS packets received from the second PE device since the second PE router made no such similar announcement. In this way, the forwarding plane of the first PE router may properly decapsulate and forward VPLS frames from the respective PE routers in a hybrid or heterogeneous PE router space.

In one example, a method includes sending, by a first provider edge (PE) router and to a second PE router that is configured to provide a VPLS, a first layer three (L3) control plane message that includes first configuration information for forwarding VPLS frames to the first PE router, the first L3 control plane message comprising a request that the VPLS frames include a control word when forwarded to the first PE router. The method may also include receiving, by the first PE router and from the second PE router, a second L3 control plane message that includes second configuration information for forwarding VPLS frames to the second PE router, the second L3 control plane message not comprising a request that the VPLS frames include the control word when forwarded to the second PE router. The method may also include, responsive to determining that the second L3 control plane message does not comprise the request that VPLS frames to be forwarded to the second PE router include the control word, configuring a forwarding plane of the first PE router to process VPLS frames that are received from the second PE router without processing the VPLS frames to remove the control word even though the first L3 control plane message sent by the first PE router specified the request that VPLS frames forwarded to the first PE router are to include the control word.

In one example, a network device includes one or more network interfaces that send, to a second PE router that is configured to provide a VPLS, a first layer three (L3) control plane message that includes first configuration information for forwarding VPLS frames to the first PE router, the first L3 control plane message comprising a request that the VPLS frames include a control word when forwarded to the first PE router. The one or more network interfaces may, receive, from the second PE router, a second L3 control plane message that includes second configuration information for forwarding VPLS frames to the second PE router, the second L3 control plane message not comprising a request that the VPLS frames include the control word when forwarded to the second PE router. In one example, the network device includes a VPLS module that, responsive to determining that the second L3 control plane message does not comprise the request that VPLS frames to be forwarded to the second PE router include the control word, configures a forwarding plane of the first PE router to process VPLS frames that are received from the second PE router without processing the VPLS frames to remove the control word even though the first L3 control plane message sent by the first PE router specified the request that VPLS frames forwarded to the first PE router are to include the control word.

In one example, a network system includes a network that includes: a first provider edge (PE) router; a second PE router that is configured to provide a VPLS in the network. The first PE router may send, to the second PE router that is configured to provide a VPLS, a first layer three (L3) control plane message that includes first configuration information for forwarding VPLS frames to the first PE router, the first L3 control plane message comprising a request that the VPLS frames include a control word when forwarded to the first PE router. The second PE router may send to the first PE router, a second L3 control plane message that includes second configuration information for forwarding VPLS frames to the second PE router, the second L3 control plane message not comprising a request that the VPLS frames include the control word when forwarded to the second PE router. The first PE router may, responsive to determining that the second L3 control plane message does not comprise the request that VPLS frames to be forwarded to the second PE router include the control word, configures a forwarding plane of the first PE router to process VPLS frames that are received from the second PE router without processing the VPLS frames to remove the control word even though the first L3 control plane message sent by the first PE router specified the request that VPLS frames forwarded to the first PE router are to include the control word.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
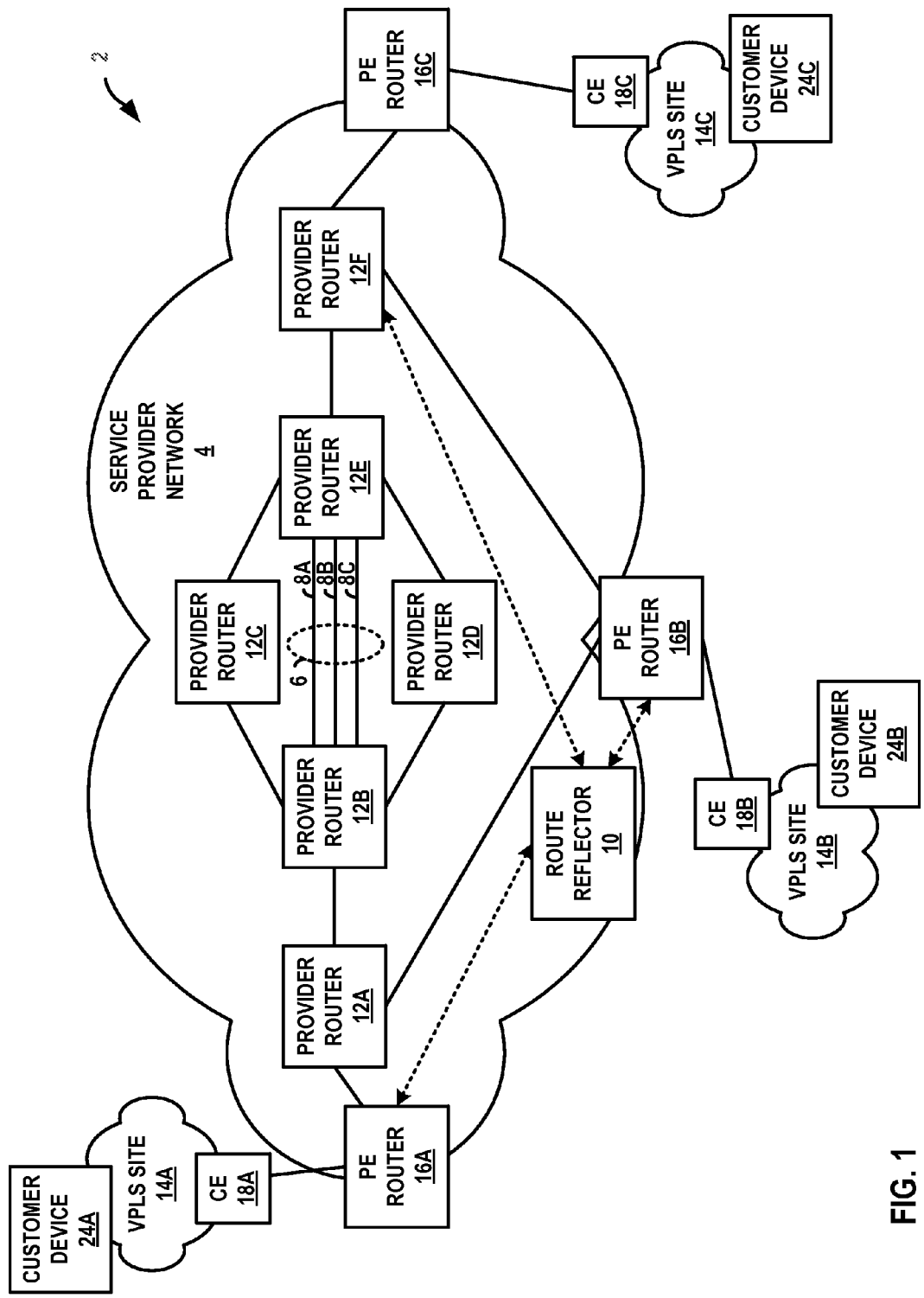
FIG. 1 is a block diagram illustrating an example system that includes a provider edge router implementing techniques for decapsulating and forwarding BGP-VPLS frames in a hybrid PE router space, in accordance with techniques of the disclosure.

FIG. 1 is a block diagram illustrating an example system that includes a provider edge router implementing techniques for decapsulating and forwarding BGP-VPLS frames in a hybrid PE router space, in accordance with techniques of the disclosure. As shown in FIG. 1, system 2 includes service provider network 4 (SP network 4) and Virtual Private LAN Service (VPLS) sites 14A-14C ("VPLS sites 14"). SP network 4 may comprise the Internet or other network. In some cases, SP network 4 may comprise a multi-protocol label switching (MPLS) network.

Each of VPLS sites 14 may include a local area network (LAN) or a wide area network (WAN) that comprises a plurality of subscriber devices, such as desktop computers, laptops, workstations, PDAs, wireless devices, network-ready appliances, file servers, print servers or other devices. VPLS sites 14 may comprise private networks for different offices of a single enterprise.

As shown in FIG. 1, SP network 4 includes provider edge (PE) routers 16A-16C ("PE routers 16") and route reflector 10. Each of PE routers 16 couples to one or more of VPLS sites 14 via customer edge (CE) devices 18A-18C ("CE devices 18"). For example, PE router 16A is coupled to VPLS site 14A via CE device 18A (e.g., a router or switch). PE router 16B is coupled to VPLS site 14B via CE device 18B, and PE router 16C is coupled to VPLS site 14C via CE device 18C. CE devices 18 may generally be any suitable network device, including but not limited to a router, switch, or bridge.

SP network 4 may represent a public network that is owned and operated by a service provider or a set of cooperating service providers to interconnect a plurality of edge networks, such as VPLA sites 14 (or "customer networks"). As a result, SP network 4 may be referred to herein as a "core network" in that SP network 4 may act as a core to interconnect other SP networks or edge networks, such as VPLS sites 14. Example service providers include Verizon Communications Inc. or American Telephone & Telegraph (AT&T™) Company.

The service providers may lease portions of SP network 4 or provide bridging (or switching) services offering interconnection through SP network 4 to VPLS sites 14, which may lease the portions or purchase the services provided by SP network 4 to create a Layer 2 Virtual Private Network (L2VPN) interconnecting the various layer 2 (L2) customer SP network 4. The bridging service may be, for example, an L2VPN, a Virtual Private Local Area Network (LAN) Service (VPLS), or a virtual leased line (VLL). Reference to layers followed by a numeral may refer to a particular layer of the Open Systems Interconnection (OSI) model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein.

A VPLS domain established across SP network 4 may transport layer two (L2) communications, such as Ethernet packets, between VPLS sites 14. That is, a VPLS domain may be used to extend VPLS sites 14 through SP network 4 in a transparent manner, i.e., as if SP network 4 does not exist. PE routers 16 may define label switched paths (LSPs) within SP network 4 to carry encapsulated L2 communications across SP network 4. The LSPs may be used as pseudowires (PWs) to emulate a L2 communication service, such as Ethernet, over SP network 4 in order to exchange encapsulated L2 communications, such as Ethernet packets, across SP network 4 as though devices of the VPLS sites were directly attached to the same local area network (LAN).

In the illustrated embodiment, SP network 4 provides a type of L2VPN, a VPLS instance to transparently interconnect these layer 2 networks, e.g., VPLS sites 14, to one another via SP network 4. SP network 4 may provide the VPLS to a customer by transparently emulating a direct connection between these various VPLS sites 14 such that, from the perspective of VPLS sites 14, each of VPLS sites 14 appears to directly connect to one another. Moreover, different VPLS instances, including corresponding virtual routing and forwarding information (VRFs), may be maintained by routers within SP network 4.

VPLS sites 14 may each represent a network owned and operated by a large entity, such as a university, corporation, business, or other facility or enterprise. In some instances, a single large entity may own and operate two or more of VPLS sites 14. The entity may then contract with SP network 4 to purchase a service offered by SP network 4, such as a VPLS instance, in order to transparently interconnect these VPLS sites 14.

Each of VPLS sites 14 may operate according to a wide variety of network protocols, such as any of the 802.3X family of network protocols related to the Ethernet protocol, any of the 802.1X family of wireless networking protocols, an Internet Protocol (IP) protocol, and a Transmission Control Protocol (TCP). Moreover, one or more of VPLS sites 14 may comprise a Virtual Private Network (VPN), a Large Area Network (LAN), or a Wide Area Network (WAN). Each of VPLS sites 14 may include a wide variety of interconnected computing devices or nodes, such as customer devices 24A-24C. Examples of computing devices or nodes include web servers, print servers, application servers, data servers, workstations, desktop computers, laptop computers, cellular or other mobile devices, Personal Digital Assistants (PDAs), and any other device cable of connecting to a computer network via a wireless and/or wired connection.

While discussed herein with respect to a particular network device, i.e., a router, PEs 16 may each represent any network device that interfaces with a network, such as one of VPLS sites 14, to route, switch, bridge or otherwise forward network traffic directed to or originating from the network. For example, PEs 16 may each represent, in certain instances, one or more of a switch, a hub, a bridge device (e.g., an Ethernet bridge), or any other L2 network device and, in some instances, L3 network devices capable of performing L2 functionality.

An administrator, network operator or other user configures each of PE routers 16 to provision what are referred to as "pseudowires" and commonly abbreviated as "PWs." In the example of FIG. 1, pseudowires are configured to enable a logical form of L2 connectivity and provision a VPLS service. Pseudowires are logical network connections formed from two unidirectional label switched paths (LSPs) that emulate a connection not natively offered by SP network 4 for consumption outside the boundaries of that SP network 4. For example, SP network 4 may implement a L3 network that internally supports L2 functionality in that it implements L2 functions to support the L3 functions offered externally for consumption by L2 VPLS sites 14. Pseudowires may emulate a L2 connection within SP network 4 enabling SP network 4 to offer emulated L2 connectivity for consumption by L2 VPLS sites 14 as VPLS. More information regarding pseudowires can be found in Request for Comments (RFC) 3985, entitled "Pseudo Wire Emulation Edge-to-Edge (PWE3) Architecture," which is hereby incorporated by reference as if set out in its entirety in this disclosure.

To configure VPLS, pseudowires may be provisioned in a "full-mesh" configuration, meaning that each of the PE routers 16 that provide VPLS for consumption by the subscribing entity is interconnected by way of one of pseudowires to every other one of the PE routers 16 that provide VPLS for consumption by the subscribing entity. In the example of FIG. 1, each of PE routers 16 provide access to VPLS for consumption by VPLS sites 14, and therefore each of PE routers 16 is connected to every other PE device 16 via pseudowires. Once pseudowires are configured in this manner, VPLS may be enabled within PE routers 16 to operate over the pseudowires, which may in this context operate as logical dedicated links through SP network 4. In operation, VPLS generally involves appending or otherwise inserting a VPLS tag and a pseudowire identifier into incoming L2 packets, which may also be referred to as L2 frames (particularly in the context of Ethernet), and transmitting the tagged packets through a corresponding one of the configured pseudowires, as described in more detail below.

Once VPLS is configured within SP network 4, L2 VPLS sites 14 may communicate with one another via VPLS as if they were directly connected L2 networks. Initially, prior to enabling data traffic, L2 VPLS sites 14 issue control communications to resolve loops and other traffic oddities that may prevent proper communication both within each of and between L2 customer networks 14.

As shown in FIG. 1, SP network 4 establish pseudowires by configuring one or more of provider routers 12A-12F and PE routers 16 to provision a full-mesh configuration. Generally, provider routers 12A-12F may each represent, in certain instances, one or more of a switch, a hub, a bridge device (e.g., an Ethernet bridge), or any other L2 network device and, in some instances, L3 network devices capable of performing L2 functionality. As shown in FIG. 1, each of provider routers 12, PE routers 16, CE devices 18, customer devices 24, and route reflector 10 may be operatively coupled to one another by one or more network links, which may be physical and/or wireless network links.

There are two standardized VPLS implementations supported by the IETF. The first is RFC 4761: Virtual Private LAN Service (VPLS) Using BGP for Auto-Discovery and Signaling (BGP-VPLS). The second is RFC 4762: Virtual Private LAN Service (VPLS) Using LDP Signaling (LDP-VPLS). Generally, the two VPLS implementation vary with respect to two characteristics: discovery and signaling. Discovery refers to the method that is used that enables multiple PE routers participating in a VPLS domain to find each other. Signaling refers to what protocol is used to set up MPLS tunnels and distribute labels between PEs for packet demultiplexing. In BGP-VPLS, BGP is used to perform both discovery and signaling.

Discovery occurs when a PE router, e.g., PE router 16A, is added to SP network 4, and a single BGP session is initially established between PE router 16A and route reflector 10. PE router 16A then joins a VPLS domain (for example, a new branch office is opened and needs connectivity) when the VPLS instance is configured on PE router 16A, and one or more customer-facing ports on PE router 16A are associated with that VPLS instance (each VPLS instance is identified by a particular Route Target BGP Extended Community, which is configured as part of configuring a VPLS instance). Once this occurs, PE router 16A advertises that it is part of the VPLS domain via route reflector 10 to other PE routers 16 that are joined in that VPLS instance. In this way, PE routers 16 become "aware" of PE router 16A and these PE routers 16 now have the information they need to establish LSPs with PE router 16A automatically. Generally, route reflector 10 may be a network device that simplifies configuration in BGP-VPLS, which requires a full mesh. Route reflector 10 is configured to readvertise routes learned from BGP peers such as PE routers 16, so rather than requiring all of PE routers 16 to be fully meshed, in terms of BGP peering, with each other, route reflection may require only that route reflector 10 be peered with all of PE routers 16.

Signaling in BGP-VPLS to provision labels between PEs for packet demultiplexing uses pre-block allocation of labels. A label block may refer to a set of demultiplexor labels used to reach a given VPLS site within a set of remote sites. A PE router, such as PE router 16A, uses a label block to send a single common update message to establish a pseudowire with multiple PE routers, such as PE routers 16B-16C, instead of having to send an individual message to each PE router. A demultiplexor is used in VPLS to distinguish among several different streams of traffic carried over a tunnel. A demultiplexor may be an MPLS label, although any suitable may also be used. In the case of VPLS, the demultiplexor not only indicates to which specific VPLS a packet belongs, but also identifies the ingress PE router. The former information is used for forwarding the packet; the latter information is used for learning MAC addresses. More information concerning the use of demultiplexor labels can be found in RFC 4761 entitled "Virtual Private LAN Service (VPLS) Using BGP for Auto-Discovery and Signaling," dated January 2007, which is hereby incorporated by reference as if fully set forth herein.

BGP-VPLS uses label blocks to enable a PE router to send a single (common) update message that contains demultiplexors for all the remote PE routers, instead of N individual messages. Doing this reduces the control plane load both on the originating PE as well as on the BGP Route Reflectors that may be involved in distributing this update to other PE routers. A label block, defined by a label base LB and a VE block size VBS, is a contiguous set of labels {LB, LB+1, . . . , LB+VBS−1}. To assign labels for all of PE routers 16 within a given VPLS, PE routers 16 are assigned unique VE IDs as part of their configuration. A PE router, such as PE router 16A, wishing to send a VPLS update sends the same label block information to all other PE routers 16. Each of receiving PE routers 16 infers the label intended for PE router 16A by adding its (unique) VE ID to the label base. In this manner, each receiving PE gets a unique demultiplexor for PE router 16A for that VPLS. This technique may be enhanced with the concept of a VE block offset VBO. A label block defined by <LB, VBO, VBS> is the set {LB+VBO, LB+VBO+1, . . . , LB+VBO+VBS−1}. Thus, instead of a single large label block to cover all VE IDs in a VPLS, one can have several label blocks, each with a different label base.

As described above, PE routers 16A-16C may implement the MPLS protocol and apply one or more MPLS labels, i.e., a label stack, to network packets in accordance with routing and forwarding information configured at each respective PE router. A label stack applied to a network packet may include multiple labels. For instance, a label stack may include an outer label and an inner label. The outer label serves as a "transport label" that uniquely identifies a PE router in an MPLS core. That is, each of PE routers 16A-16C may exchange control plane messages at configuration and startup that advertise an outer label as part of the label stack that uniquely identifies each respective PE router. For instance, PE router 16A may send control plane messages that specify an outer label that identifies PE router 16A to PE routers 16B-16C. PE routers 16B-16C may configure their respective forwarding next hops such that network packets that include the outer label corresponding to PE router 16A are forwarded to PE router 16A. The inner label, or "service label," of the MPLS label stack provides VPLS-specific configuration information to indicate the destination PE router of destination network traffic. Together, the "inner label inner L2 header or and payload may together be referred to as an MPLS payload.

When a PE router, such as PE router 16A, initially advertises its label block it exchanges BGP Network Layer Reachability Information (NLRI) information with other PE routers 16. VPLS BGP NLRI has the following information elements: a VE ID, a VE Block Offset, a VE Block Size, and a label base. In some examples, PE router 16A attaches a Layer 2 Info Extended Community to the NLRI that may specify, among other information, whether a control word must or must not be present when sending VPLS packets to PE 16A. As further described now below, a control word may be inserted by a PE router to prevent the payload of the VPLS frame from being treated as an MPLS packet carrying an IP network packet when performing preliminary inspection of the VPLS frame during a lookup in a forwarding plane of the PE router. More information regarding a control word can be found in Request for Comments (RFC) 4385, entitled "Pseudowire Emulation Edge-to-Edge (PWE3) Control Word for Use over an MPLS PSN," dated February 2006, which is hereby incorporated by reference as if set out in its entirety in this disclosure.

The need to implement a control word may arise when a provider router that is coupled or multi-homed to another provider router by multiple links in SP network 4, must send all of the VPLS frames in a particular network flow along the same link to ensure the frames do not become unordered from a particular sequence. For instance, as shown in FIG. 1, provider router 12B may be coupled or multi-homed to provider router 12E by multiple network links. Network links 8A-8C operatively couple provider routers 12B and 12E together. Each of network links 8A-8C may provide, as non-limiting examples, a 10- or 100-gigabit, physical Ethernet connection between provider routers 12B and 12E. In some examples, provider routers 12B and 12E may each run a layer 2, multi-link protocol such Link Aggregation Control Protocol (LACP) as defined in IEEE 802.1AX-2008. In this way, as network links 8A-8C may appear as a single logical link 6 or Link Aggregation Group (LAG) to each of provider routers 12B and 12E.

As provider router 12B forwards a flow of VPLS frames to provider router 12E, provider router 12B may perform a hashing function on one or more pieces of information included in the header of a VPLS frame. Example information may include, but is not limited to, a 5-tuple of source and destination IP addresses, source and destination ports, and protocol. Any combination of different types of information from an ingress frame may be used in the hash function. In any case, provider router 12B may determine, based on the generated hashcode, an index corresponding to an egress interface of provider router 12B that is operatively coupled provider router 12E by one of network links 8A-8C. In this way, provider router 12B may evenly distribute the forwarding of network packets in logical link 6. Because information included the headers of VPLS frames of a network flow may be the same (e.g., destination IP address is the same for each frame in the network flow), the hashing value generated by provider router 12B for each frame may be the same and therefore, each of the frames in the flow may be forwarded using the same one of network links 8A-8C. In this way, a sequence of VPLS frames in a particular network flow may not become out of order by using the same one of network links 8A-8C rather than distributing the frames evenly across each of network links 8A-8C.

In some instances, however, provider router 12B may mistakenly identify an ingress VPLS frame as an MPLS packet carrying an IP network packet as payload. To illustrate, provider router 12B may make different forwarding decisions on network packets depending on whether the packets are determined to be IP packets or not. Thus, provider router 12B may perform a preliminary inspection of header information at a defined location of the network packet that would include an IP version number of "4" or "6," corresponding respectively to IPv4 and IPv6. If the information at the defined location of the header indicated a "4" for IPv4, then provider router 12B would forward the network packet according to forwarding information, based on hashing to the correct link, specified for IPv4 type network packets. In some examples, a VPLS frame may specify a portion of a destination MAC address, of an L2 header that is part of the payload, at the same, defined location of the network packet header that would include an IP version number. If the portion of the destination MAC address included a value of "4," then the forwarding plane of provider router 12B may mistakenly treat the packet as an MPLS packet carrying an IPv4 network packet as payload. By treating the VPLS frame as an MPLS packet as carrying an IPv4 payload, the forwarding plane of provider router 12B may forward the VPLS frame out of an egress interface corresponding to one of network links 8 that is different than the egress interface used to forward the other VPLS frames of the network flow. This can happen as the above misinterpretation may cause the invariance of the hash value computed on the flow-defining field to be violated. This may, in turn, result in the sequence of VPLS frames becoming out of sync.

To prevent out-of-order delivery of VPLS frames in a particular network flow, a PE router, such as PE router 16A may initially specify, in a Layer 2 Info Extended Community of VLPLS NLRI sent other PE routers, whether a control word must or must not be present when sending VPLS packets to PE router 16A. The control word may be a string of 32 bits that inserted directly after the MPLS header of the VPLS frame and before the destination MAC address, as further described in FIG. 3 and RFC 4385, reference in this disclosure. By inserting the control word between the MPLS header and the inner L2 header, the control word may effectively shift the destination MAC address to the right within the VPLS frame header. Thus, when a provider router performs a preliminary inspection of VPLS frame at the defined location of the header that would include an IP version number if the payload in this MPLS packet was IP, the provider router would determine a value of "0" rather than some portion of the destination MAC address. Consequently, a VPLS frame that would otherwise include "4" in the defined location of the header and as a portion of the destination MAC address is still properly forwarded out the same egress interface of a logical link. In this way, such VPLS frames including the control word and included in a particular network flow remain synchronized in the proper sequence.

Although techniques exist that enable a PE router to signal NLRI that requests the use of a control word in VPLS frames, not all PE routers in a service provider network may support the implementation of a control word. For instance, SP network 4 may include a heterogeneous or hybrid PE router space, in which a subset of PE routers 16 support a control word, while the remaining subset do not support a control word (e.g., legacy systems or systems that have not yet been upgraded). In one example, PE router 16A supports a control word and may send NLRI with an Extended Community requesting that other receiving PE routers 16B-16C send VPLS frames to PE router 16A using a control word. PE router 16B may be a legacy system that does not support the use of a control word, and therefore may still send VPLS frames to PE router 16A without using a control word. Upon receiving VPLS frames from PE router 16B, PE router 16A may decapsulate VPLS frames as though a control word were included in the headers. That is, PE router 16A may remove information from the frame (e.g., a portion of the destination MAC address) that is needed to properly forward the frame to VPLS site 14A.

Techniques of the present disclosure enable PE router 16A to properly decapsulate and forward network traffic from PE routers 16B-16C in a heterogeneous or hybrid PE router space. In the example of FIG. 1, PE routers 16A and 10C may each support techniques for inserting a control word in VPLS frames; however, PE router 16B may not support a control word. To configure its forwarding plane to properly decapsulate VPLS frames without a control word from PE router 16B and VPLS frames that include controls words from PE router 16C, PE router 16A initially sends a BGP NLRI message that includes NLRI with an Extended Community requesting that other receiving PE routers 16B-16C send VPLS frames to PE router 16A using a control word. Similarly, each of PE routers 16B-16C outputs a BGP NLRI message that includes NLRI with an Extended Community. In this example, the Extended Community of the NLRI from PE router 16C includes an indication that other routers are to insert a control word when sending VPLS frames to PE router 16C because PE router 16C supports decapsulation of VPLS frames having a control word. In contrast, in this example, the NLRI from PE router 16B does not include an indication that other routers are to insert a control word when sending VPLS frames to PE router 16B.

PE router 16A, responsive to determining that although PE router 16A requested PE router 16B to use a control word when constructing VPLS frames to be sent to PE router 16A, PE router 16B did not make a similar requirement, PE router 16A may then determine that PE router 16B is likely a legacy router that will be unable to process the requirement set forth by PE router 16A. Therefore, PE router 16A may configure its forwarding plane to decapsulate and forward VPLS frames differently depending on whether such frames are received from PE router 16B or PE router 16C.

In particular, PE router 16A may configure its forwarding plane to remove the control word from VPLS frames that are received from PE router 16C before forwarding the frames to VPLS site 14A. In some examples, PE router 16A may remove the MPLS label stack from the VPLS frames as a part of removing the control word. PE router 16A may also configure its forwarding plane to not perform a control word removal from VPLS frames that are received from PE router 16B before forwarding the frames to VPLS site 14A because PE router 16A has determined that PE router 16B likely does not recognize or support the request by PE router 16A to insert a control word when constructing VPLS frames to be sent to PE router 16A. In this way, the forwarding plane of PE router 16A may properly configure its forwarding plane to decapsulate and forward VPLS frames from PE routers 16B-16C in a hybrid or heterogeneous PE router space.

Figure 2:
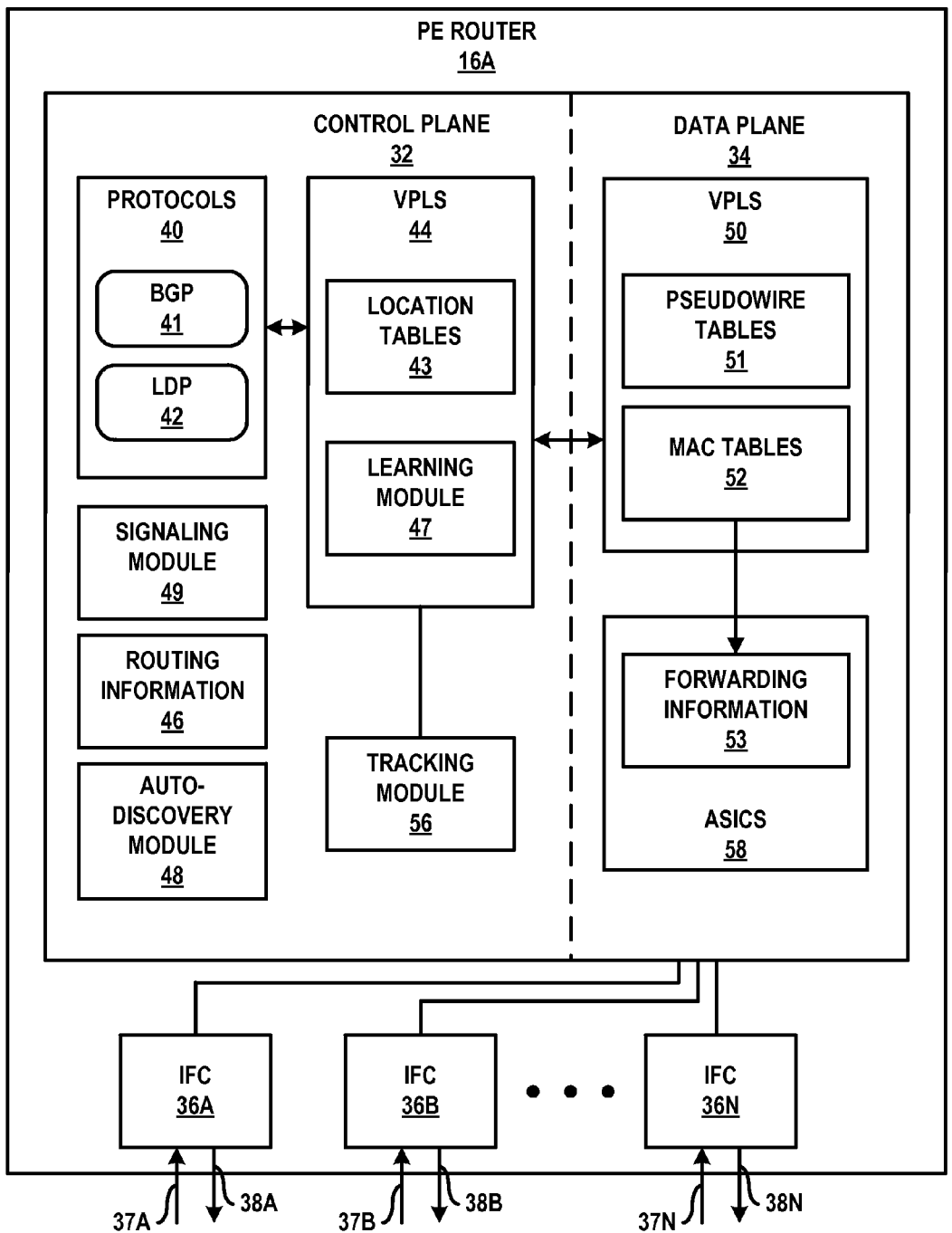
FIG. 2 is a block diagram illustrating an example PE router of FIG. 1 in greater detail, in accordance with techniques of the disclosure.

FIG. 2 is a block diagram illustrating an example PE router 16A of FIG. 1 in greater detail, in accordance with techniques of the disclosure. Router 16A may comprise a PE router for decapsulating and forwarding BGP-VPLS frames in a hybrid PE router space as described in FIG. 1. Router 16A includes interface cards 36A-36N ("IFCs 36") that receive control packets and data packets via inbound links 37A-37N ("inbound links 37") and send control packets and data packets via outbound links 38A-38N ("outbound links 38"). IFCs 36 are typically coupled to links 37, 38 via a number of interface ports. Router 30 also includes a control plane 32 that determines routes of received packets and a data plane 34 (or "forwarding plane") that forwards the packets accordingly via IFCs 36.

Control plane 32 represents high-level control functions for router 30 and typically provides routing protocols, device management and configuration functions and other administrative functions. For example, control plane 32 provides an operating environment for protocols 40 to execute, which may be software processes executing on one or more processors. In the illustrated embodiment, protocols 40 include the border gateway protocol (BGP) 41 as an exemplary routing protocol and the label distribution protocol (LDP) 42.

Control plane 32 maintains routing information 46. Routing information 46 describes the topology of a network and, in particular, routes through the network. Routing information 46 may include, for example, route data that describes various routes within service provider network 4, and corresponding next hop data indicating appropriate neighboring devices within service provider network 4 for each of the routes. Protocols 40 (e.g., BGP module 41 and LDP 4 module 2) executing within control plane 32 of PE router 16A update routing information 46 to accurately reflect the topology of the autonomous system in which PE router 16A resides as well as label distributions utilized by PE router 16A. Control plane 32 generates and maintains forwarding information 53 within data plane 34 based on routing information 46. Typically, control plane 32 generates forwarding information 53 in the form of a radix tree to map packet information (e.g., header information having destination information and/or a label stack) to next hops and ultimately to interface ports of IFCs 36. Forwarding information 53 is programmed into Application Specific Integrated Circuits (ASICS) 58. ASICs 58 are microcode-controlled chipsets that are programmably configurable by one or more processors. Specifically, one or more of ASICs 58 are controllable by microcode programmed by one or more processors.

Data plane 34 represent hardware and logic functions that provide high-speed forwarding of network traffic. Data plane 34 maintains forwarding information 53 for each VPLS established by PE router 16A to associate network destinations with specific next hops and the corresponding interface ports. In general, when PE router 16A receives a data packet on a pseudowire of a given VPLS via one of inbound links 37, data plane 34 identifies an associated next hop for the data packet by traversing forwarding information 53 based on information (e.g., labeling information) within the packet. Data plane 34 forwards the data packet on one of outbound links 38 to the corresponding next hop in accordance with forwarding information 53 associated with the VPLS. At this time, data plane may push and/or pop labels from the packet to forward the packet along a correct pseudowire.

Control plane 32 also includes a VPLS module 44 having learning module 47 that performs L2 learning, e.g., learning of customer device MAC addresses from inbound PWs and association of those customer MAC addresses with corresponding outbound PWs and output interfaces. VPLS module 44 maintains location tables 43 for each VPLS instance established by PE router 16A. Learning module 47 may alternatively reside within data plane 34.

A tracking module 56 included in control plane 32 updates location tables 43. Control plane 32 also includes an auto-discovery module 48 and a signaling module 49. Data plane 34 includes a VPLS module 50 capable of communicating with VPLS module 44. VPLS module 50 maintains pseudowire tables 51, MAC tables 52 and forwarding information 52 for each VPLS established by PE router 16A. For example, VPLS module 50 maintains MAC tables 52 to reflect state information learned via layer 2 communications.

Auto-discovery module 48 performs auto-discovery to determine which network devices within service provider network 4 are members of a given VPLS. Auto-discovery module 48 sends control messages via outbound links 38 to all the PE routers and border routers in the service provider network. Auto-discovery module 48 may send the control messages using a reliable transport protocol, such as BGP module 41. The control messages between PE router 16A and the PE routers may comprise internal BGP (iBGP) messages. The control messages may, in some examples, comprise external BGP (eBGP) messages so as to allow border routers participating in an inter-Autonomous System VPLS instance (e.g., two or more border routers) to automatically discover each other and exchange VPLS site ID via eBGP advertisements.

Signaling module 49 outputs control-plane messages to automatically establish pseudowires between PE router 16A and each of the PE routers in service provider network 4 based on the one of location tables 43 associated with the VPLS. Signaling module 49 may signal the PE routers using a label distribution protocol, such as LDP 42. Signaling module 49 then communicates with VPLS module 44 to automatically cause VPLS module 44 to update one of the pseudowire tables 51 associated with the VPLS within VPLS module 50.

VPLS module 50 included in data plane 34 performs MAC address learning to automatically update portions of forwarding information 53 for each VPLS established by PE router 16A. As part of data plane 34, VPLS module 50 is invoked when router 16A receives data packets on the pseudowires (PWs) established by router 16A for any of the PE routers in service provider network 4 that are members of a given VPLS. VPLS module 50 performs MAC address learning and updates the one of MAC tables 52 associated with the VPLS to initially record associations between the PWs connected to PE router 16A and the source MAC addresses of the VPLS customer devices from which the data packets were received on the PWs. For example, the one of MAC tables 52 records PW numbers that identify the PWs connected to PE router 16A and records MAC addresses that identify the source customer devices attached to the first AS of the data packets transmitted over the PWs. In effect, PE router 16A, a L3 device, learns associations between MAC address and pseudowires (which are mapped to ports), much as a L2 switch learns associations between MAC addresses and ports. Forwarding information 53 may represent a virtual port binding and bridging table. In this sense, the router is acting as a virtual L2 switch to provide VPLS service.

In order to update the one of the MAC tables 52, learning module 43 of VPLS module 44 in control plane 32 performs L2 learning and association of L2 customer MAC addresses with specific PWs. Learning module 42 then communicates information recorded in the one of location tables 43 that is associated with the VPLS instance to VPLS module 50 in data plane 34. In this way, VPLS module 50 may be programmed with associations between each PW and output interface and specific source customer MAC addresses reachable via those PWs. VPLS module 50 updates the one of MAC tables 52 associated with the VPLS to associate the customer MAC addresses with the appropriate outbound PW. After the update, the one of MAC tables 52 associated with this particular VPLS instance records associations between the PWs connected to PE router 16A that are used to transport L2 traffic to the MAC addresses of the customer devices within the VPLS sites of the VPLS instance. In other words, the one of MAC tables 52 for this VPLS instance records associations between the PWs and the network devices to which data packets may be sent on the PWs. For example, the one of MAC tables 52 records PW numbers that identify the PWs sourced by PE router 16A, and for those PW numbers identifies the MAC addresses of the reachable customer devices within the VPLS instance.

VPLS module 50 receives data packets on inbound links 37 that are destined for one of the PE routers in the VPLS. VPLS module 50 determines whether the destination customer MAC address of the data packets is included in the one of MAC tables 52 associated with the VPLS. If the MAC address is included in the one of MAC tables then PE router 16A forwards the data packets to the destination PE router on the PW associated with the MAC address based on forwarding information 53 associated with the VPLS. If the customer MAC address is not included in the one of MAC tables 52 then ASICS 58 flood the data packets to all of the PE routers in the VPLS via the PWs based on forwarding information 53 associated with the VPLS.

In accordance with techniques of the disclosure for decapsulating and forwarding VPLS frames in a hybrid PE router space, PE router 16A may initially advertise NLRI to other PE routers 16B-16B at configuration and startup. More specifically, VPLS module 44 may initially generate NLRI that includes, among other information, a VPLS label block as described in FIG. 1 and RFC 4761. NLRI for VPLS information is illustrated in Table 1:

TABLE 1

| Extended Community |
| --- |
| Extended community type (2 octets) |
| Encaps Type (1 octet) |
| Control Flags (1 octet) |
| Layer-2 MTU (2 octet) |
| Reserved (2 octets) |

When generating the NLRI, VPLS module 44 generates information to request that PE routers 16B and 16C insert a control word in VPLS frames that are destined to PE router 16A. In particular, the information to request control word insertion by other PE routers may include setting a "C-bit" or "C-flag" to 1 in the Extended Community attached to NLRI. Table 1 illustrates the Extended Community layout as specified in RFC 4761:

TABLE 1

| Extended Community |
| --- |
| Extended community type (2 octets)<br>Encaps Type (1 octet)<br>Control Flags (1 octet)<br>Layer-2 MTU (2 octet)<br>Reserved (2 octets) |

The C-bit is set in the Control Flags field of Table 1, which is organized as a bit vector illustrated in Table 2:

TABLE 2

| Control Flag Bit Vector | | | | | | | |
| --- | --- | --- | --- | --- | --- | --- | --- |
| 0 | 1 | 2 | 3 | 4 | 5 | 6 | 7 |
| MBZ | | | | | | C | S |

As shown in Table 2, values as bit indexes 0-5 must be zero (MBZ), while bit index 6 is set to 1 or 0 to indicate whether a control word must or must not be present when sending VPLS packets to PE router 16A. A value of 1 at bit index 6 indicates that PE routers must insert a control word in VPLS frames sent to PE router 16A, while a value of 0 indicates that the PE routers must not insert a control word in VPLS frames sent to PE router 16A. Bit index 7 indicates whether sequenced delivery of frames must or must not be used when sending VPLS packets to PE router 16A, depending on whether S is 1 or 0, respectively.

VPLS module 44 communicates with BGP 41 to generate BGP NLRI messages that includes the generated NLRI. In particular, the Extended Community of the NLRI includes a C-bit that is set to 1, to indicate that network traffic sent to PE router 16A must include an inserted control word. BGP 41 sends the messages to ASICS 58. Based on the header information included in the BGP NLRI messages, ASICS 58 determine that the BGP NLRI messages are destined to PE routers 16B and 16C. ASICS 58 determine, based on forwarding information 53, which of IFCs 36A-36N are egress interfaces for PE routers 16B and 16C respectively. ASICS 58 then send the BGP NLRI messages with the NLRI to PE routers 16B-16C.

PE routers 16B and 16C may also send BGP announcements including NLRI to PE router 16A. The NLRI from PE routers 16B and 16C specify information that instructions PE router 16A how to send VPLS network traffic to PE routers 16B and 16C. As described with respect to FIG. 1, PE router 16C supports the use of a control word. Consequently, PE router 16C generates NLRI with an Extended Community that includes a C-bit that is set to 1, to indicate that network traffic sent to PE router 16C must include an inserted control word. PE router 16C sends the NLRI in a BGP NLRI message to PE router 16A.

As described with respect to FIG. 1, PE router 16B does not support the use of a control word. Consequently, PE router 16B generates NLRI with an Extended Community that does not include a C-bit that is set to 1. In some examples, the C-bit may be set to 0, or may not be set at all by PE router 16B. Thus, because PE router 16B does not support the use of a control word, PE router 16B may request that a control word not be included in traffic sent to it from PE router 16A, although PE router 16A has requested that PE router 16B insert a control in network traffic sent to it by PE router 16B. PE router 16B sends the NLRI in a BGP NLRI message to PE router 16A.

VPLS module 44 may receive the BGP NLRI messages from PE routers 16B and 16C via data plane 34, which initially receives the messages at IFCs of IFCs 36A-36N that correspond to PE routers 16B and 16C. With respect to the NLRI received from PE router 16C, VPLS module 44 may determine that the C-bit of the Extended Community is set to 1. Therefore, based on the C-bit value, VPLS module 44 determines that network traffic sent by PE router 16C must include an inserted control word. Moreover, VPLS module 44 determines that because PE router 16C supports a control word, PE router 16A may receive VPLS network traffic from PE router 16C that includes a control word. Therefore, VPLS module 44 may configure forwarding information 53 to decapsulate and forward VPLS network traffic (received from PE router 16C) that includes a control word.

Based on the NLRI received from PE router 16C, VPLS module 44 may send information to VPLS module 50 that configures forwarding information 53 to extract a control word from VPLS frames that are received by PE router 16A from PE router 16C. For instance, forwarding information 53 may include one or more chained next hops. A chained next hop includes a group of one or more next hops, wherein each next hop includes a group of one or more instructions that are executed by the packet forwarding engine. VPLS module 50 may configure forwarding information 53 such that one or more chained next hops that correspond to source header information of PE router 16C, when executed, cause ASCIS 58 extract a control word from a VPLS frame before forwarding the frame to VPLS site 14A. In some examples, forwarding information 53 may define a logical interface in one of the next hops of the chained next hops. The logical interface may be associated with one or more operations that identify a specified location of the control and remove the control word from the VPLS frame header. The final next hop in the chained next hops may specify the egress interface of IFCs 36A-36N that is operatively coupled to VPLS site 14A. ASICS 58, upon processing the VPLS frame and removing the control word from the VPLS frame header, may forward the VPLS frame to VPLS site 14A using the specified egress interface.

Based on the NLRI received from PE router 16B, VPLS module 44 may send information to VPLS module 50 that configures forwarding information 53 to skip the extraction of a control word from VPLS frames that are received by PE router 16A from PE router 16B. That is, because PE router 16B sent an announcement indicating that VPLS network traffic be sent to PE router 16B without specifying a request to use a control word, although PE router 16A requested that VPLS network traffic frame PE router 16B must include a control word, VPLS module 44 may determine that PE router 16B does not support a control word. VPLS module 44 may send information to VPLS module 50 to configure forwarding information 53 such that one or more chained next hops that correspond to source header information of PE router 16B, when executed, cause ASCIS 58 skip or refrain from extracting a control word from a VPLS frame before forwarding the frame to VPLS site 14A. In some examples, forwarding information 53 may define a logical interface for skipping control word extraction in one of the next hops of the chained next hops. That is, the chained next hops may specify two different logical interfaces—a first logical interface that extracts a control word from a VPLS frame header and a second logical interface that does not extract a control word from a VPLS frame header. In this way, when ASICS 58 process VPLS frames from PE router 16C, the chained next hops forward the VPLS frames to the first logical interface, which extracts a control word from VPLS frames as described above. Alternatively, when ASICS 58 process VPLS frames from PE router 16B, the chained next hops forward the VPLS frames to the second logical interface, which skips extracting a control word from VPLS frames. In one example, VPLS module 44 may generate a first next hop within a group of chained next hops, wherein the first hop specifies at least one operation to execute a second next hop that removes a control word when processing VPLS messages from PE router 16C and not execute the second next hop when processing VPLS messages from PE router 16B. As described above, the final next hop in the chained next hop for VPLS frames received from PE router 16B may specify the egress interface of IFCs 36A-36N that is operatively coupled to VPLS site 14A. ASICS 58, upon processing the VPLS frame and removing the control word from the VPLS frame header, may forward the VPLS frame to VPLS site 14A using the specified egress interface.

At a later time, PE router 16C may send a VPLS frame through service provider network 4 that is destined to VPLS site 14A. PE router 16A may initially receive the VPLS frame at the ingress interface of IFCs 36A-36N. ASICS 58 may process the frame header to perform an ingress lookup using forwarding information 53. In particular, ASICS 58 may determine that the source IP and/or MAC addresses of the VPLS frame header correspond to PE router 16C. Based on the IP and/or MAC addresses, ASICS 58 may perform an ingress lookup and execute one or more chained next hops based on the lookup. One of the hops in the chained next hops may correspond to a logical interface that removes a control word from a VPLS frame. To remove the control word, ASICS 58 may perform a 32-bit shift left operation of the destination MAC address included in the frame header. That is, if the control word is a 32-bit value, shifting the destination MAC address left 32-bits restores the MAC address to its original location before the control word was inserted by PE router 16C. ASICS 58 may then execute any remaining chained next hops, which may specify the egress interface of IFCs 36A-36N. ASICS 58 may forward the VPLS frame, without the control word, to VPLS site 14A.

PE router 16B may also send a VPLS frame through service provider network 4 that is destined to VPLS site 14A. PE router 16A may initially receive the VPLS frame at the ingress interface of IFCs 36A-36N. ASICS 58 may process the frame header to perform an ingress lookup using forwarding information 53. In particular, ASICS 58 may determine that the source IP and/or MAC addresses of the VPLS frame header correspond to PE router 16B. Based on the IP and/or MAC addresses, ASICS 58 may perform an ingress lookup and execute one or more chained next hops based on the lookup. One of the hops in the chained next hops may correspond to a logical interface that skips or refrains from removing a control word from a VPLS frame. That is, because PE router 16A previously configured its data plane to not remove a control word from VPLS frames received from PE router 16B, the chained next hops will not perform an operation to remove a control word. ASICS 58 may then execute any remaining chained next hops, which may specify the egress interface of IFCs 36A-36N. ASICS 58 may forward the VPLS frame to VPLS site 14A. In this way, PE router 16A, implementing techniques of the disclosure, may configure its data plane 34 to perform operations that remove a control word from VPLS frames sent from PE router 16C, while not performing operations to remove a control word from VPLS frames sent from PE router 16B.

Although described above with respect to two logical interfaces, in some examples, a single logical interface may be implemented by ASICS 58 to remove a control word. In other examples, no additional logical interfaces are generated by ASICS 58 to remove a control word, and instead, the control word is removed at the egress interface of PE router 16A. The operations described with respect to the techniques of the disclosure may be applied in any suitable implementation of forwarding data plane 34 and/or IFCs 36A-36N.

The architecture of PE router 16A illustrated in FIG. 2 is shown for exemplary purposes only. The disclosure is not limited to this architecture. In other embodiments, PE router 16A may be configured in a variety of ways. In one embodiment, for example, some of the functionally of control plane 32 and data plane 34 may be distributed within IFCs 36. In another embodiment, control plane 32 may include a routing engine that performs routing functions and maintains routing information base (RIB), e.g., routing information 46, and data plane 34 may include a forwarding engine that performs packet forwarding based on a forwarding information base (FIB), e.g., forwarding information 53, generated in accordance with the RIB and MAC tables 52.

Control plane 32 and data plane 34 may be implemented solely in software, or hardware, or may be implemented as combinations of software, hardware, or firmware. For example, control plane 32 and data plane 34 may include one or more processors which execute software instructions. In that case, the various software modules of control plane 32 and data plane 34 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable media.

Figure 3:
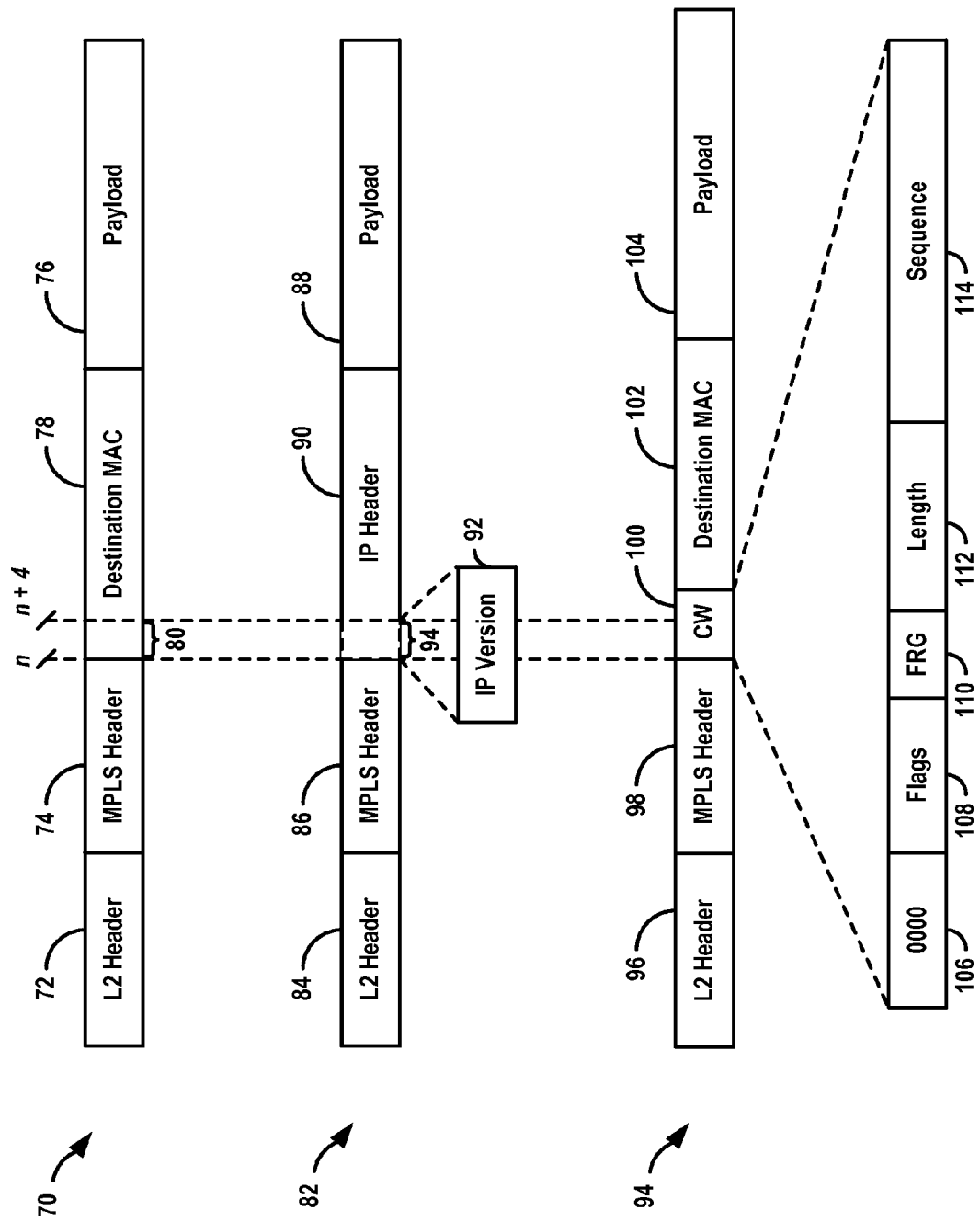
FIG. 3 is a block diagram illustrating exemplary message formats of a VPLS message without a control word, an MPLS packet carrying an IP network packet as payload, and a VPLS message with a control word, in accordance with techniques of the disclosure.

FIG. 3 is a block diagram illustrating exemplary message formats of a VPLS message without a control word, an MPLS packet carrying an IP network packet as payload, and a VPLS message with a control word, in accordance with techniques of the disclosure. The illustrations of FIG. 3 are intended for exemplary purposes to illustrate the layout of content within network packets and VPLS frames. The scale and illustrations of such network packets and VPLS frames should not be understood to limit the size of any field, the order of the fields, or the content within the fields.

As shown in FIG. 3, VPLS frame 70 includes an L2 header 72, an MPLS header 74, a destination MAC address 76 inside the inner L2 header, and a payload 78. As illustrated in FIG. 3, the first nibble 80 (i.e., bits n through n+4) of the destination MAC address 76 following MPLS header 74 may include a portion of the destination MAC address. In some examples, the value first nibble 80 may be a "4" or a "6." As previously described in this disclosure, a provider router in service provider network 4 may inspect this defined location at first nibble 80 of a network communication (e.g., IP network packet or L2 frame) to determine whether a valid IP version number exists in the location, which could be taken to conclude about the payload as to whether it is an IP packet payload. Such valid IP version numbers may include a "4" or a "6." If a valid IP version number exists in first nibble 80 of VPLS frame 70, the provider router may incorrectly process the VPLS frame for forwarding as an MPLS packet carrying an IP packet with regards to the fields on which the hash is computed for forwarding purposes.

To further illustrate, FIG. 3 also includes an MPLS packet 82 carrying an IP packet. MPLS packet 82 includes an L2 header 84, an MPLS header 86, an IP header 88, and a payload 90. IP header 88 includes a first nibble 94 directly following the MPLS header 86. IP header 88 includes a first nibble 94 directly following the MPLS header 86. First nibble 94 may indicate an IP version 92 of the IP network packet. As illustrated in FIG. 3, a provider router of service provider network 4 may inspect the same location of destination MAC address 76 in the inner L2 header (e.g., first nibble 80) that the provider router inspects to determine IP version 92 of IP header 88 (e.g., first nibble 94).

As previously described in this disclosure, PE routers 16 may insert a control word in the location of VPLS frames that is inspected by provider routers for the IP version number of IP packets. VPLS frame 94 illustrates an inserted control word to prevent out-of-order delivery. VPLS frame 94 includes an L2 header 96, an MPLS header 98, a control word 100 a destination MAC address 102 of the inner L2 header, and a payload 104. The contents of control word 100 are specified by RFC 4385, referenced above in this disclosure. Control word 100 may be a 32-bit value that encodes values in different fields of the control word. For instance, the first nibble 106 of control word 100 includes a string of four bits, each set to zero. Flags field 108 may be used by for per-payload signaling, and the semantics of flags 108 are defined in a pseudowire specification. FRG field 110 or the "fragmenting field" may be used when fragmenting a pseudowire payload. Length field 112 may specify the size of the padding added a router to the VPLS frame for the control word, and hence may be used by a router to extract the payload from the frame. Sequence field 114 implements the sequencing function as defined in RFC 3985, referenced above in this disclosure.

As can be seen in FIG. 3, control word 100 causes destination MAC address 102 to be shifted to the right and out of the defined location that a provider router inspects when determining an IP version number. Because control word 100 includes zero values in the first nibble 106 following the MPLS header 98, a provider router may inspect the location of first nibble 106 determine a value of zero. Therefore, the provider router may not incorrectly compute the hash for forwarding VPLS frame 94 by assuming it to be carrying IP network packet as payload and prevent out-of-order delivery of VPLS frame 94.

As described with respect to FIGS. 1 and 2, PE routers 16A and 16C may each support control word insertion in VPLS frames, while PE router 16B may not. Initially, PE router 16A may send to PE router 16B that is configured to provide a VPLS, a first layer three (L3) control plane message that includes first configuration information to forward VPLS frames to the second PE router. The first L3 control plane message may be a BGP NLRI message with an Extended Community that includes a C-bit set to 1. The first L3 control plane message may include a request that PE router 16B insert a control word in VPLS frames that are destined to the PE router 16A. The request may, in some examples, be a C-bit set to 1 in the Extended Community. PE router 16A may send a similar BGP NLRI message to PE router 16C.

PE router 16B and PE router 16C may each send BGP announcements, respectively, that include NLRI. In some examples, route reflector 10 may send the respective BGP announcements to other PE routers in service provider network 4. That is, PE router 16A may receive from PE routers 16B, a second L3 control plane message, such as a BGP NLRI message, that includes configuration information to forward VPLS frames to PE router 16B. The second L3 control plane message may be a BGP NLRI message with an Extended Community that includes a C-bit set to 0. In other examples, the second L3 control plane message may not include an Extended Community at all. In still other examples, the Extended Community may include information corresponding to a C-bit but PE router 16B may not have altered a default value for the C-bit. In any case, the second L3 control plane message may not include a request that PE router 16A insert a control word in VPLS frames that are destined to PE router 16B. That is, there may not be a C-bit value set to 1 in the Extended Community of the BGP NLRI message.

Upon receiving the BGP NLRI messages from PE routers 16B and 16C, PE router 16A may configure its forwarding plane as described in FIGS. 1 and 2. That is, responsive to determining that the second L3 control plane message does not comprise a request that the PE router 16A insert the control word in VPLS frames that are destined to PE router 16B, PE router 16A may configure its forwarding plane to forward VPLS frames that are received from PE router 16B without processing the VPLS frames to remove the control word. PE router 16A may also configure its forwarding plane to process VPLS frames to remove a control word for VPLS frames received from PE router 16C.

At a later time, PE router 16A may receive a VPLS frame from PE router 16C. The format of the VPLS frame may be structured as VPLS frame 94. Upon performing an ingress look, PE router 16A may perform one or more chained next hops to process the VPLS frame before forwarding it to its destination (e.g., VPLS site 14A). One or more of the chained next hops may specify operations to remove control word 100 from the VPLS frame. To remove control word 100, PE router 16A may perform any number of different techniques, such as left shifting destination MAC address 102 by 32-bits to overwrite control word 100, or alternatively copying destination MAC address 102 to begin at the first nibble following MPLS header 98. PE router 16A may therefore store into the 32-bits that immediately follow an MPLS header included in the VPLS frame, at least a portion of a destination MAC address included in the VPLS frame to overwrite the control word. Upon extracting control word 100, PE router 16A may forward the VPLS frame to its destination.

PE router 16A may also receive a VPLS frame from PE router 16B. The format of the VPLS frame may be structured as VPLS frame 70. Upon performing an ingress look, PE router 16A may perform one or more chained next hops to process the VPLS frame before forwarding it to its destination (e.g., VPLS site 14A). Because PE router 16A has previously determined that PE router 16B does not support a control word and configured the forwarding plane of PE router 16A accordingly, PE router 16A may forward the VPLS frame without processing the VPLS frame to remove the control word. That is, PE router 16A will not extract or remove data at the first 32-bits following MPLS header 98 where the control word would otherwise be included. Upon processing any remaining chained next hops, PE router 16A may forward the VPLS frame to its destination.

Figure 4:
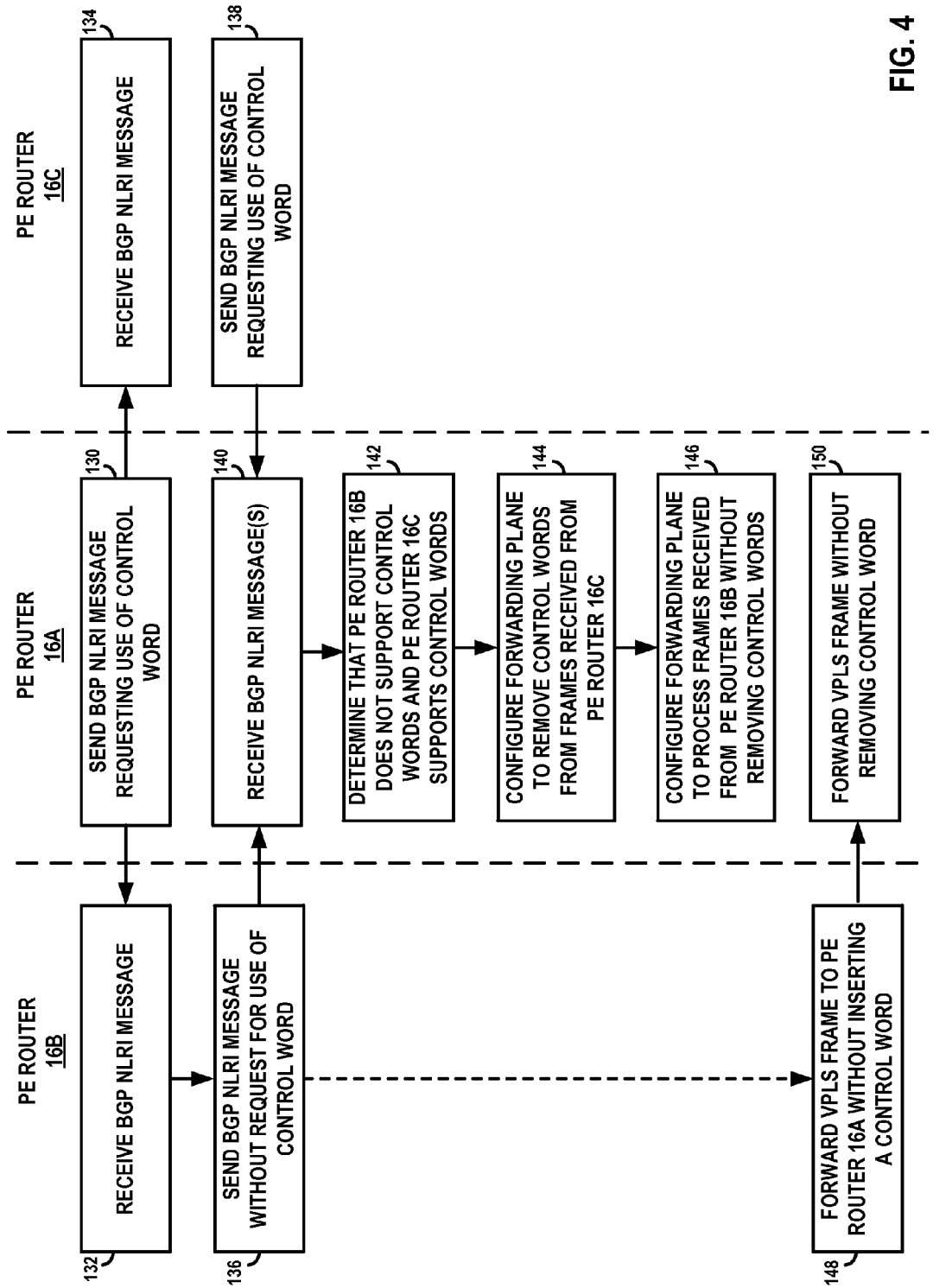
FIG. 4 is a flowchart illustrating example operations for decapsulating and forwarding VPLS frames in a hybrid PE router space, in accordance with techniques of the disclosure.

FIG. 4 is a flowchart illustrating example operations for decapsulating and forwarding VPLS frames in a hybrid PE router space, in accordance with techniques of the disclosure. Example operations in accordance with techniques of the disclosure are illustrated for example purposes with respect to PE router 16A, PE router 16B, and PE router 16C as described in FIGS. 1-3. As shown in FIG. 4, PE router 16A may, at initial configuration and startup to join a VPLS instance, send BGP NLRI messages that include NLRI and an Extended Community to PE routers 16B and 16C, as described in FIGS. 1-3 (130). In particular, the Extended Community may include a C-bit set to a value to 1 to request that each of PE routers 16B and 16C send VPLS frames to PE router 16A with a control word inserted in the VPLS frame headers.

In this example, PE router 16B initially receives a BGP NLRI message from PE router 16A announcing reachability information for router 16A that, in this example, includes an indicator (C-bit) that routers forwarding VPLS frames to destinations reachable through PE router 16A should utilize a control word (132). However, because in this example PE router 16B does not support the use of a control word, PE router 16B ignores this request for use of a control word and instead configures its forwarding plane to forward VPLS frames that are destined for PE router 16A without inserting a control word. PE router 16C also receives a BGP NLRI message from PE router 16A (134). PE router 16C configures its forwarding plane to insert a control word into VPLS frames that are destined for PE router 16A.

Similarly, PE router 16C may output a BGP NLRI message announcing reachability information and, in this example, indicate that other routers of the VPLS network are to use a control word when sending VPLS frames PE router 16C (138). Similarly, PE router 16B may output a BGP NLRI message; however, the BGP NLRI message may not include a request to insert a control word in VPLS frames forwarded to PE router 16B since, in this example, PE router 16B is a legacy router that does not support such a feature. PE router 16A receives the respective BGP NLRI messages from each of PE routers 16B and 16C (140). Upon receiving the BGP NLRI message from PE router 16C, PE router 16A determines that the PE router 16C supports the use of a control word (142). PE router 16A, upon receiving the BGP NLRI message from PE router 16B, determines that PE router 16B does not support the use of a control word because although PE router 16A requested that PE router 16B insert controls words in VPLS frames, PE router 16B announcement of NLRI was not accompanied by a request to insert a control word in VPLS frames.

Based on its determination that PE router 16C supports a control word, PE router 16A configures its forwarding plane to extract or otherwise remove the control word from VPLS frames received from PE router 16C before forwarding the VPLS frames (144). PE router 16A, based on its determination that PE router 16B does not support a control word although PE router 16A requested the use of a control word, configures its forward plane to process VPLS frames received from PE router 16B without removing a control word before forwarding the VPLS frames (146). In this way, the forwarding plane of PE router 16A is configured to perform an ingress lookup and remove a control word from frames forwarded by PE routers that support the use of a control word while processing and skipping removal of a control word from frames forwarded by PE routers that do not support the use of a control word. In other words, techniques of the disclosure, implemented by PE router 16A enable PE router 16A to correctly decapsulate and forward VPLS frames received from PE routers in a hybrid PE router space.

At a later time, PE router 16B may forward a VPLS frame to PE router 16A (148). In response to receiving the VPLS frame, PE router 16A may perform a lookup on the VPLS frame and execute a group of chained next hops that does not include one or more operations to remove a control word from the VPLS frame. PE router 16A, upon processing the VPLS frame, forwards the VPLS frame to its destination (150).

Figure 5:
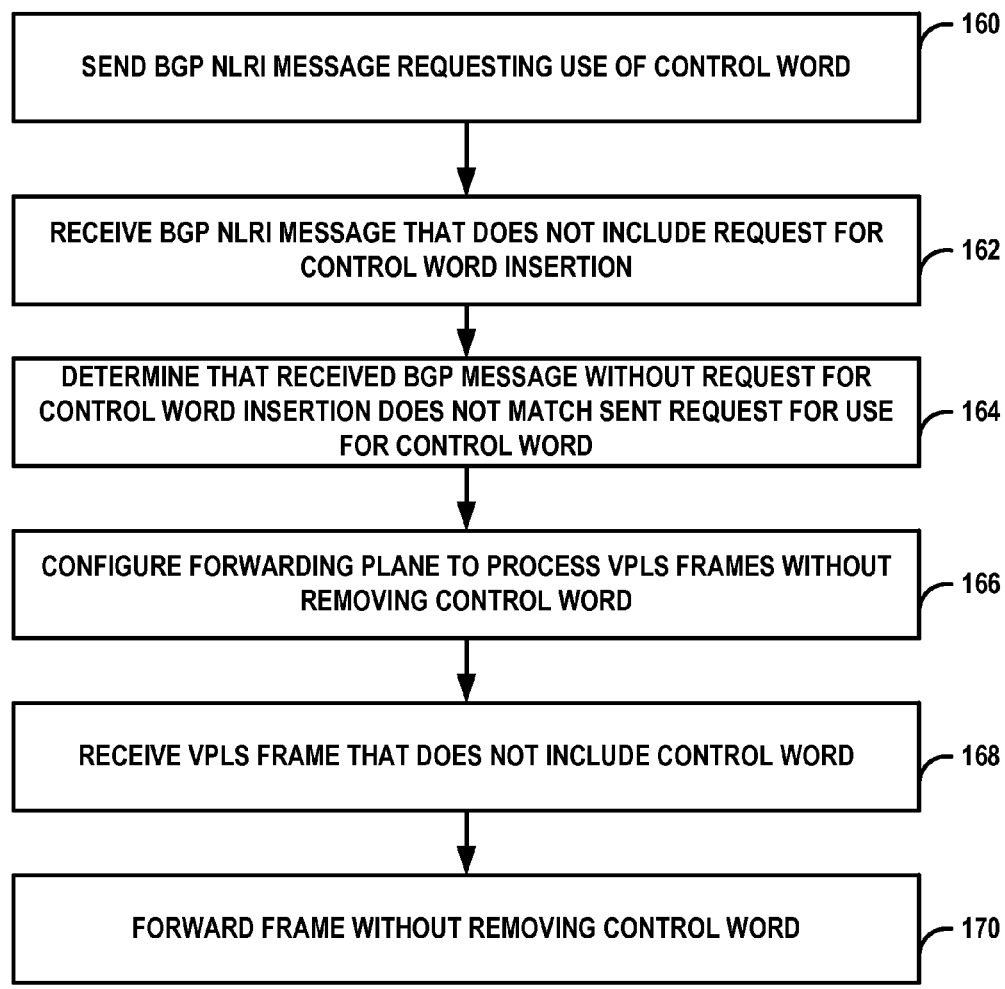
FIG. 5 is a flowchart illustrating example operations of a network device for decapsulating and forwarding VPLS frames in a hybrid PE router space, in accordance with techniques of the disclosure.

FIG. 5 is a flowchart illustrating example operations of a network device for decapsulating and forwarding VPLS frames in a hybrid PE router space, in accordance with techniques of the disclosure. Example operations in accordance with techniques of the disclosure are illustrated for example purposes with respect to PE router 16A as described in FIGS. 1-4. Initially, PE router 16A sends BGP NLRI messages that include NLRI and an Extended Community to PE routers 16B and 16C, as described in FIGS. 1-4 (160). In particular, the Extended Community may include a C-bit set to a value to 1 to request that each of PE routers 16B and 16C send VPLS frames to PE router 16A with a control word inserted in the VPLS frame headers.

PE routers 16B and 16C may send BGP NLRI messages that are received by PE router 16A (162). The BGP NLRI message from PE router 16C requests the insertion of a control word in VPLS frames forwarded by PE router 16A to PE router 16C. The BGP NLRI message from PE router 16B does not include a request to insert a control word in VPLS frames forwarded by PE router 16A to PE router 16B. PE router 16A determines that the PE router 16C supports the use of a control word and also determines that PE router 16B does not support the use of a control word because although PE router 16A requested that PE router 16B insert controls words in VPLS frames, PE router 16B provided a BGP announcement that included NLRI that was not accompanied by a request to insert a control word in VPLS frames.

Based on its determination that PE router 16C supports a control word, PE router 16A configures its forwarding plane to extract or otherwise remove the control word from VPLS frames received from PE router 16C before forwarding the VPLS frames. PE router 16A, based on its determination that PE router 16B does not support a control word although PE router 16A requested the use of a control word, configures its forward plane to process VPLS frames without removing a control word before forwarding the VPLS frames (166). At a later time, PE router 16B may forward a VPLS frame to PE router 16A (168). In response to receiving the VPLS frame, PE router 16A may perform a lookup on the VPLS frame and execute a group of chained next hops that does not include one or more operations to remove a control word from the VPLS frame. PE router 16A, upon processing the VPLS frame, forwards the VPLS frame to its destination (170).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Various embodiments of the invention have been described. These and other embodiments are within the scope of the following claims.

The invention claimed is:

1. A method comprising:
 sending, by a first provider edge (PE) router and to second and third PE routers that are configured to provide a VPLS, a first layer three (L3) control plane message that includes first configuration information for forwarding VPLS frames to the first PE router, wherein the first PE router is an intermediate device between the second and third PE routers, and the first L3 control plane message comprising a request that the VPLS frames include a control word when forwarded to the first PE router;
 receiving, by the first PE router and from the second PE router, a second L3 control plane message that includes second configuration information for forwarding VPLS frames to the second PE router, the second L3 control plane message not comprising a request that the VPLS frames include the control word when forwarded to the second PE router;
 receiving, by the first PE router and from the third PE router, a third L3 control plane message that includes third configuration information for forwarding VPLS frames to the third PE router, the third L3 control plane message comprising a request that the VPLS frames include the control word when forwarded to the third PE router;
 responsive to determining that the second L3 control plane message does not comprise the request that VPLS frames to be forwarded to the second PE router include the control word, configuring a forwarding plane of the first PE router to process VPLS frames that are received from the second PE router without processing the VPLS frames to remove the control word even though the first L3 control plane message sent by the first PE router specified the request that VPLS frames forwarded to the first PE router are to include the control word; and
 responsive to determining that the third L3 control plane message does comprise the request that VPLS frames to be forwarded to the third PE router include the control word, configuring the forwarding plane of the first PE router to process VPLS frames received from the third PE router to remove the control word.

2. The method of claim 1, further comprising responsive to receiving a VPLS frame from the second PE router, forwarding, by the first PE router the VPLS frame without processing the VPLS frame to remove the control word.

3. The method of claim 1,
 wherein the first L3 control plane message is a first Border Gateway Protocol (BGP) Network Layer Reachability Information (NLRI) message, the first BGP NLRI message including an Extended Community that comprises a C-bit set to a value of 1, and
 wherein the second L3 control plane message is a second BGP NLRI message, the second BGP NLRI message not including an Extended Community that comprises a C-bit set to a value of 0.

4. The method of claim 1, further comprising:
 responsive to receiving a VPLS frame from the third PE router, removing, by the first PE router, the control word from the VPLS frame and forwarding the VPLS frame.

5. The method of claim 1, wherein removing the control word from the VPLS frame further comprises:
 storing, by the first PE router and into 32-bits that immediately follow an MPLS header included in the VPLS frame, at least a portion of a destination MAC address included in the VPLS frame to overwrite the control word.

6. The method of claim 1, wherein configuring the forwarding plane of the first PE router to remove the control word from VPLS frames that are received from the third PE router further comprises:
 generating, by the first PE router, a next hop within a group of chained next hops, wherein the next hop specifies at least one operation to remove the control word from the VPLS frame.

7. The method of claim 6, wherein the next hop is a first next hop, the method further comprising:
 generating, by the first PE router, a second next hop within a group of chained next hops, wherein the second hop specifies at least one operation to execute the first next hop when processing VPLS messages from the third PE router and not execute the first next hop when processing VPLS messages from the second PE router.

8. The method of claim 1,
wherein the second PE router does not support inserting the control word into the VPLS frame, and
wherein the VPLS frame from the second PE router does not include the control word.

9. A network device that is a first provider edge (PE) router, wherein the network device comprises:
one or more network interfaces that send, to second and third PE routers that are configured to provide a VPLS, a first layer three (L3) control plane message that includes first configuration information for forwarding VPLS frames to the first PE router, wherein the network device is an intermediate device between the second and third PE routers, and the first L3 control plane message comprising a request that the VPLS frames include a control word when forwarded to the first PE router;
wherein the one or more network interfaces, receive, from the second PE router, a second L3 control plane message that includes second configuration information for forwarding VPLS frames to the second PE router, the second L3 control plane message not comprising a request that the VPLS frames include the control word when forwarded to the second PE router;
wherein the one or more network interfaces receive, from the third PE router, a third L3 control plane message that includes third configuration information to forward VPLS frames to the third PE router, the third L3 control plane message comprising a request that the VPLS frames include the control word when forwarded to the third PE router;
a VPLS module that, responsive to determining that the second L3 control plane message does not comprise the request that VPLS frames to be forwarded to the second PE router include the control word, configures a forwarding plane of the first PE router to process VPLS frames that are received from the second PE router without processing the VPLS frames to remove the control word even though the first L3 control plane message sent by the first PE router specified the request that VPLS frames forwarded to the first PE router are to include the control word, and
responsive to determining that the third L3 control plane message includes the request that the first PE router insert the control word in VPLS frames that are destined to the third PE router, configures the forwarding plane of the first PE router to process VPLS frames received from the third PE router to remove the control word.

10. The network device of claim 9,
wherein the forwarding plane, responsive to receiving a VPLS frame from the second PE router, forwards the VPLS frame without processing the VPLS frame to remove the control word.

11. The network device of claim 9,
wherein the first L3 control plane message is a first Border Gateway Protocol (BGP) Network Layer Reachability Information (NLRI) message, the first BGP NLRI message including an Extended Community that comprises a C-bit set to a value of 1, and
wherein the second L3 control plane message is a second BGP NLRI message, the second BGP NLRI message not including an Extended Community that comprises a C-bit set to a value of 0.

12. The network device of claim 9,
wherein the forwarding plane, responsive to receiving a VPLS frame from the third PE router, removes the control word from the VPLS frame and forwards the VPLS frame.

13. The network device of claim 9, wherein the forwarding plane stores, into 32-bits that immediately follow an MPLS header included in the VPLS frame, at least a portion of a destination MAC address included in the VPLS frame to overwrite the control word.

14. The network device of claim 9, wherein the VPLS module generates a next hop within a group of chained next hops, wherein the next hop specifies at least one operation to remove the control word from the VPLS frame.

15. The network device of claim 14,
wherein the next hop is a first next hop, and
wherein the VPLS module generates a second next hop within a group of chained next hops, wherein the second hop specifies at least one operation to execute the first next hop when processing VPLS messages from the third PE router and not execute the first next hop when processing VPLS messages from the second PE router.

16. The network device of claim 9,
wherein the second PE router does not support inserting the control word into the VPLS frame, and
wherein the VPLS frame from the second PE router does not include the control word.

17. A network system comprising:
a network that includes:
a first provider edge (PE) router;
a second PE router that is configured to provide a VPLS in the network; and
a third PE router that is configured to provide a VPLS in the network,
wherein the first PE router is an intermediate device to the second and third PE routers,
wherein the first PE router sends, to the second and third PE routers, a first layer three (L3) control plane message that includes first configuration information for forwarding VPLS frames to the first PE router, the first L3 control plane message comprising a request that the VPLS frames include a control word when forwarded to the first PE router,
wherein the second PE router sends to the first PE router, a second L3 control plane message that includes second configuration information for forwarding VPLS frames to the second PE router, the second L3 control plane message not comprising a request that the VPLS frames include the control word when forwarded to the second PE router,
wherein the third PE router sends to the first PE router, a third L3 control plane message that includes third configuration information for forwarding VPLS frames to the third PE router, the third L3 control plane message comprising a request that the VPLS frames include the control word when forwarded to the third PE router,
wherein the first PE router, responsive to determining that the second L3 control plane message does not comprise the request that VPLS frames to be forwarded to the second PE router include the control word, configures a forwarding plane of the first PE router to process VPLS frames that are received from the second PE router without processing the VPLS frames to remove the control word even though the first L3 control plane message sent by the first PE router specified the request that VPLS frames forwarded to the first PE router are to include the control word, and wherein the first PE router, responsive to determining that the third L3 control plane message includes the request that the first PE router insert the control word in VPLS frames that are destined to the third PE router, configures the forwarding plane of the first PE router to process VPLS frames received from the third PE router to remove the control word from VPLS frames that are received from the third PE router.

18. The network system of claim 17, wherein the forwarding plane, responsive to receiving a VPLS frame from the second PE router, forwards the VPLS frame without processing the VPLS frame to remove the control word.

19. The network system of claim 17, wherein the first L3 control plane message is a first Border Gateway Protocol (BGP) Network Layer Reachability Information (NLRI) message, the first BGP NLRI message including an Extended Community that comprises a C-bit set to a value of 1, and wherein the second L3 control plane message is a second BGP NLRI message, the second BGP NLRI message not including an Extended Community that comprises a C-bit set to a value of 0.

20. The network system of claim 17, wherein the first PE router, responsive to receiving a VPLS frame from the third PE router, removes the control word from the VPLS frame and forwards the VPLS frame.

* * * * *